United States Patent [19]

Mandai et al.

[11] Patent Number: 4,533,931
[45] Date of Patent: Aug. 6, 1985

[54] REDUCTION REOXIDATION TYPE SEMICONDUCTOR CERAMIC CONDENSER

[75] Inventors: Harufumi Mandai, Osaka; Kiyoshi Iwai; Yasuyuki Naito, both of Kyoto, all of Japan

[73] Assignee: Murata Manufacturing Co., Ltd., Kyoto, Japan

[21] Appl. No.: 577,020

[22] Filed: Feb. 6, 1984

[30] Foreign Application Priority Data

Feb. 7, 1983 [JP] Japan ................................ 58-19459

[51] Int. Cl.³ ...................... H01L 29/12; H01G 9/00
[52] U.S. Cl. ...................................... 357/10; 361/433
[58] Field of Search ............... 361/433, 303, 305, 320, 361/321; 357/10; 29/570

[56] References Cited

U.S. PATENT DOCUMENTS 3,529,218 9/1970 Nitta et al. ................... 361/433 X Primary Examiner—L. T. Hix
Assistant Examiner—Douglas S. Lee
Attorney, Agent, or Firm—Finnegan, Henderson, Farabow, Garrett & Dunner

[57] ABSTRACT

A reduction reoxidation ceramic semiconductor having a central ceramic portion with a dielectric layer formed thereon by oxidation. The ohmic electrode is formed from a material (e.g. an aluminum-glass frit) that prevents formation of the dielectric layer under the ohmic electrode during reoxidation. The non-ohmic electrode is formed on the dielectric layer.

10 Claims, 9 Drawing Figures

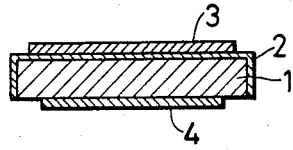
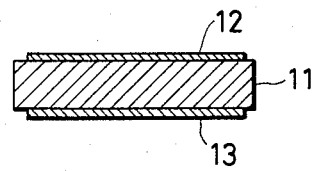
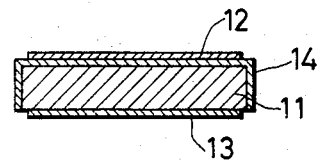
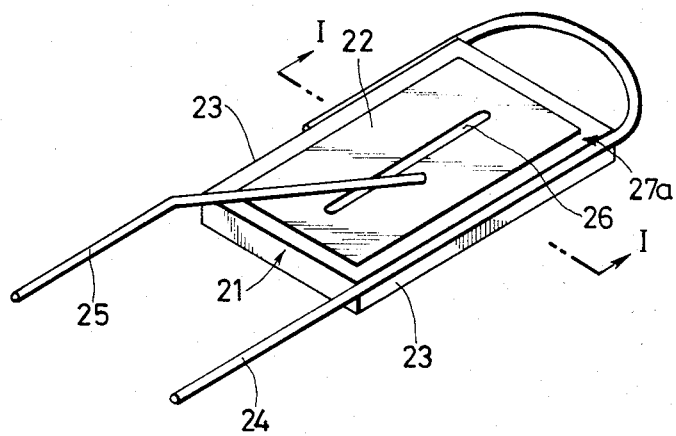
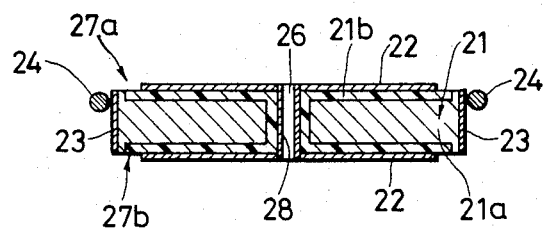

REDUCTION REOXIDATION TYPE SEMICONDUCTOR CERAMIC CONDENSER

BACKGROUND OF THE INVENTION

This invention relates to a ceramic condenser and, particularly, to a reduction reoxidation type ceramic semiconductor condenser capable of having a large capacitance within a small sized body.

Conventional prior art ceramic condensers of the cylinder or plate type have a significant disadvantage in that their size is necessarily large if a large capacitance in the order of 1 $\mu$F is desired.

For this reason, laminated ceramic condensers and semiconductor ceramic condensers were developed to provide a large capacitance with a small sized body. A small laminated ceramic condenser having a large capacitance can be produced; but, manufacture of such a structure requires that ceramic sheets be formed with inner electrodes laminated in several layers. The lamination is then subjected to a firing treatment and therefore the inner electrode material must be comprised of a costly noble metal of high melting point such as Au, Pt, Pd, and the like. The use of such materials is very expensive for a condenser of a large capacitance in the order of 1 $\mu$F; thus, the foregoing type of ceramic condenser finds use in only very specific applications. On the other hand, the second type of condenser, i.e., the reduction reoxidation type semiconductor ceramic condenser is characterized in that a reoxidized layer is formed on a surface of the semiconductor ceramic and it serves as a dielectric body. This type of condenser has the advantage that it gives a large capacitance within a relatively small body. It also exhibits the nonpolar property of the other types of ceramic condensers, has superior heat resistivity and frequency response, has a small leakage current, and can be manufactured at a low cost. It does, however, have the problem that its area capacitance is at most in the order of 300 nF/cm$^2$ and therefore must have a relatively large sized body to have a large capacitance in the order of 1 $\mu$F.

One proposed solution to this problem relating to reduction reoxidation type semiconductor ceramic condenser is depicted in FIG. 1. In this structure a plate shape reduction reoxidation type semiconductor ceramic 1 has a dielectric layer 2 formed on the outer surface through a reoxidizing treatment. A non-ohmic electrode 3 is formed on dielectric layer 2, and an ohmic electrode 4 is formed on an exposed portion of semiconductor 1. In a condenser of the foregoing construction, a portion of semiconductor portion 1 is exposed and the ohmic electrode 4 is formed on the surface thereof, so that the area capacitance (Cs) will approximately double (in the order of 600–800 nF/cm$^2$)that of a condenser whose whole surface is made of the dielectric layer produced through the reoxidation treatment. Conventionally, however, cutting and grinding processes are needed to expose the semiconductor portion 1 and this increases the number of process steps and, as a result, the production cost of the device is increased. Further, because the condenser body is plate shaped it is likely that cracking could occur in the cutting or grinding steps. In addition, where a number of semiconductor ceramics are processed simultaneously process control is difficult if the devices are not of the same thickness because the dielectric layer on the surface of a thinner body may not be completely removed.

SUMMARY OF THE INVENTION

It is an object of this invention to eliminate the drawbacks of the prior art and to provide a reduction reoxidation type semiconductor ceramic condenser capable of providing a large capacitance within a small sized body.

The objects of the invention are achieved by providing a reduction reoxidation type ceramic semiconductor that has a semiconductor ceramic portion, a layer of a first material on a surface of the ceramic portion with the layer forming an ohmic electrode. A dielectric layer is formed on another surface of the ceramic portion by reoxidation of the ceramic. A layer of a second material is formed on another surface of the dielectric layer and the second material forms a non-ohmic electrode. The ohmic layer is comprised of electrode forming material capable of forming the ohmic electrode during reoxidation of the ceramic portion while preventing significant oxidation of the ceramic portion in contact with the electrode forming material. Preferably, the electrode forming material is a glass frit containing aluminum metal.

BRIEF DESCRIPTIONS OF THE DRAWINGS

FIG. 1 is a cross-sectional view of a conventional condenser,

FIGS. 2 to 4 are cross-sectional views illustrating production steps to obtain a reduction reoxidation type semiconductor ceramic condenser according to this invention, with FIG. 4 showing a completed device.

FIG. 5 is a perspective view of another embodiment of this invention.

FIG. 6 is a sectional view taken along line I—I in FIG. 5,

DESCRIPTION OF THE PREFERRED EMBODIMENTS

Figure 7:
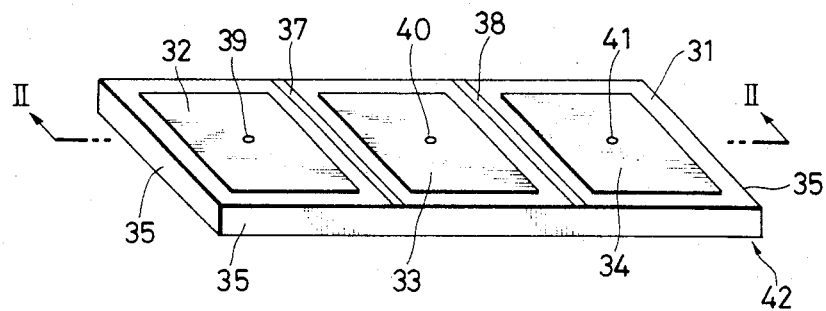
FIG. 7 is a perspective view of a still another embodiment of this invention.

This invention will be described with reference to several specific embodiments.

FIGS. 2 through 4 show the different portions of the device during production steps that form a reduction reoxidation type semiconductor ceramic condenser according to this invention.

FIG. 2 shows a semiconductor ceramic 11 obtained through a conventional reducing treatment and FIG. 3 shows this semiconductor ceramic 11 with a non-ohmic electrode paste 12 screen-printed on one face and an ohmic electrode paste 13 screen-printed on the other face. FIG. 4 shows the body having a dielectric layer 14 formed by the thermal reoxidizing heat treatment which simultaneously forms the non-ohmic electrode 12 on the layer 14 and the electrode 13 on the ceramic portion 11. The semiconductor ceramic 11 is no longer in contact with non-ohmic electrode 12 but only with the dielectric layer 14, and in another area the semiconductor ceramic 11 contacts the ohmic electrode 13. In such a process the ceramic 11 beneath the ohmic electrode does not form a dielectric layer 14; thus, this electrode 13 is in direct contact with the semiconductor ceramic 11.

Accordingly, by applying a particular material to the surface of the semiconductor ceramic it is possible to form the electrode in ohmic contact with the semiconductor ceramic without forming an underlying dielectric layer. This eliminates the work of removing a dielectric layer through a cutting or grinding process which was needed in the prior art and, a small capacitor having a large capacitance can be obtained.

In the preferred embodiment the material forming the ohmic contact is electrically conductive metal such as aluminum. A preferred composition for the paste includes aluminum powder, a solid component of glass frit comprised of lead borosilicate glass, with varnish and an organic vehicle added. The majority of this composition is aluminum powder. The material forming the ohmic layer may include 75–99.8% aluminum powder with the glass frit comprising the boro silica lead series may include 23–95 wt % of PbO, 5–40 wt % of $B_2O_3$ and 0–40 wt % of $SiO_2$, and of 0.2–25 wt % of alumina.

It is believed that a dielectric layer is not formed on the area of the semiconductor ceramic beneath the ohmic electrode comprising the electrically conductive metal because the glass frit would incorporate oxygen during the oxidizing heat treatment.

The present invention was utilized in a specific example:

A reduction reoxidation type semiconductor ceramic material, having a composition of 84.8 mol % of $BaTiO_3$, 15 mol % of $BaZrO_3$ and 0.2 mol % of $Y_2O_3$, was wet-blended, crushed together with a binder, dehydrated, and the granules refined. Refined granule material was shaped, under a pressure of 1000 kg/cm$^2$, into a disc of 12 mm in diameter and 0.5 mm in thickness. Then, it was subjected to a firing treatment in the air at 1350° C. for one hour and further subjected to a reducing treatment in a reducing atmosphere consisting of 15 vol % of hydrogen and 85% of nitrogen at 1150° C. for one hour, thereby producing a semiconductor ceramic.

In addition, a silver paste for forming the non-ohmic electrode was applied to one face of the semiconductor ceramic through a screen-printing process and aluminum paste for forming the ohmic electrode was applied to the other face of the semiconductor ceramic through the screen-printing process. The printed area of each paste was selected to be 9 mm$\phi$. Thereafter, the electrodes were baked and the reoxidizing treatment was performed simultaneously at 800° C. for one-half hour.

The capacitance (C) of the condenser thus obtained was 960 nF and its dielectric loss (tan $\delta$) was 4.5%.

For comparison, several reduction reoxidation type semiconductor ceramic condensers were produced, using the semiconductor ceramic obtained in the foregoing example, with different electrode forming methods.

In Example A, silver paste was screen-printed on both faces of the semiconductor ceramic and heat-treated at 800° C. for one-half hour.

In Example B, silver paste was screen-printed on one face of the semiconductor ceramic and heat-treated at 800° C. for one-half hour. The other face received a sprayed aluminum coating of dissolved aluminum.

In Example C, silver paste was screen-printed on one face of the semiconductor ceramic and heat-treated at 800° C. for one-half hour. The other face received an In-Ga electrode.

In Example D, silver paste was screen-printed on one face of the semiconductor ceramic, and heat-treated at 800° C. for one-half hour, and the other face was ground about 0.1 mm with a sandpaper to remove the dielectric layer and then an In-Ga electrode was formed thereon.

In Example E, silver paste was screen-printed on one face of the semiconductor ceramic and heat-treated at 800° C. for one-half hour. The other face received an ohmic electrode paste consisting of Ag, Zn and Sb which was screen-printed and then heat-treated at 400° C. for one-half hour.

The following table shows capacitance C and dielectric loss (tan $\delta$), of the above examples in comparison to an embodiment of the present invention:

TABLE 1

| EXAMPLE | C (nF) | tan $\delta$ (%) |
| --- | --- | --- |
| A | 440 | 3.6 |
| B | 350 | 5.8 |
| C | 520 | 12.6 |
| D | 880 | 4.0 |
| E | 380 | 9.5 |
| The disclosed example of the invention | 960 | 4.3 |

As is evident from the foregoing table, the reduction reoxidation type semiconductor ceramic condenser according to this invention exhibits a large capacitance in comparison to Examples A–E; thus, it can have a large capacitance within a small sized body.

The present invention may further comprise a square shaped reduction reoxidation type semiconductor ceramic with an opening formed in the thickness direction. A non-ohmic electrode is formed on the front and back faces of the square shaped semiconductor ceramic and on the interior face of the opening at the front and back faces with both electrode portions being mutually conductive. The ohmic electrode preferably is comprised of aluminum and is formed on at least one end face of the square shaped semiconductor ceramic and is insulated from the non-ohmic electrode. This condenser of the above shape exhibits a large capacitance and, as is the case of the first embodiment, it can be miniaturized.

FIGS. 5 and 6 depict a reduction reoxidation type semiconductor ceramic 21 having a square shape. A non-ohmic electrode 22 (preferably silver) is adhered to opposite sides of the square ceramic while an ohmic baked electrode 23 (preferably aluminum) are on opposite end faces. Lead wire 24 is connected to the ohmic electrode while lead 25 is connected to the non-ohmic electrode. Semiconductor ceramic 21 further includes an interior semiconductor portion 21a having a dielectric layer 21b formed on front and back faces 27a and 27b respectively. It further includes an opening 26 leading from face 27a to face 27b. The dielectric layer 21b passes through the opening 26. On the front and back faces (27a and 27b) of the semiconductor ceramic the non-ohmic electrodes 22 are formed such that they surround the opening 26 at the front and back faces. The size of the opening is smaller than the face of semiconductor ceramic 21. The electrodes 22 are inter-connected by means of a non-ohmic conductor 28 formed on the interior surface of the opening 26. Ohmic electrodes 23 are formed on opposing end faces of the semiconductor ceramic 21 and inter-connected by lead wire 24.

Another embodiment provides a reduction reoxidation type semiconductor ceramic condenser including several condenser units. The condenser is comprised of a square shape reduction reoxidation type semiconductor ceramic with a plurality of openings formed therein in the thickness direction. A plurality of non-ohmic electrodes are formed on the front and back faces of the semiconductor ceramic with a certain spacing therebetween so as to surround respective openings in the front and back faces. The ohmic electrode preferably is comprised of aluminum and is insulated with respect to the non-ohmic electrodes on at least a portion of the end face of the semiconductor ceramic or on a portion of the front and back faces as well as at least a portion of the end face. This structure can provide a large capacitance.

Figure 8:
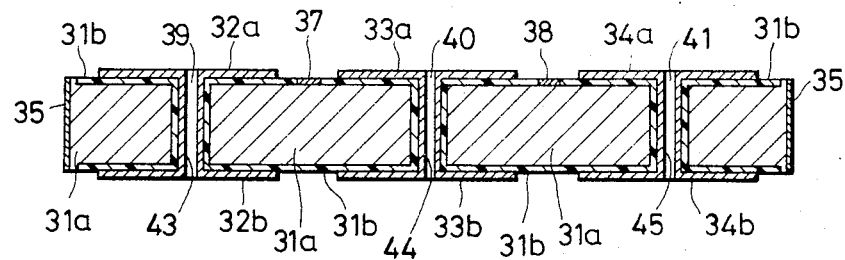
FIG. 8 is a sectional view taken along line II—II in FIG. 7.

As depicted in FIGS. 7 and 8, the reduction reoxidation type semiconductor ceramic 31 consists of a semiconductor part 31a and a dielectric layer 31b. The dielectric layer 31b is formed on the front and back faces of semiconductor ceramic 31 and on the interior face portions of openings 39, 40 and 41. Non-ohmic electrodes 32, 33 and 34 are formed on dielectric layer 31b with a certain spacing therebetween, each pair of opposing non-ohmic electrodes 32a and 32b, 33a and 33b, 34a and 34b on the front and back faces are electrically inter-connected through corresponding conductors 43, 44, 45 formed on the wall faces of corresponding openings 39, 40, 41. It should be noted that the conductors 43, 44, 45 need not be formed in place, but may comprise metal pins inserted into respective openings.

The pins may be affixed by brazing or soldering to connect opposing non-ohmic electrodes. Openings 40, 41, 42 are formed with a certain spacing therebetween in semiconductor ceramic 31 in the thickness direction. Ohmic electrodes 35 are formed on the end faces of semiconductor part 31a of the semiconductor ceramic. On one surface of semiconductor ceramic 31, the ohmic electrodes 37, 38 are formed on semiconductor part 31a between non-ohmic electrodes 32 and 33, and 33 and 34. Hence, these ohmic electrodes 37, 38 are not always necessarily formed.

The condenser 42 of this construction includes three condenser elements formed in an integral structure. Each condenser element has more than four times the capacitance of the one which is formed with opposing electrodes on the front and back faces of the reduction reoxidation type semiconductor ceramic, and can provide three times that capacitance if the non-ohmic electrodes 32, 33, 34 are connected.

Figure 9:
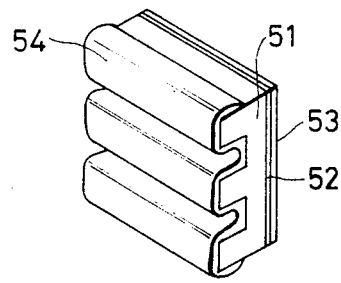
FIG. 9 is a perspective view of a further embodiment of this invention.

FIG. 9 shows an additional embodiment of the reduction reoxidation type semiconductor ceramic condenser according to this invention. A reduction reoxidation type semiconductor ceramic 51 has one flat face with the other face having ridges therein. A dielectric layer 52 is formed on the flat face of semiconductor ceramic 51 and a non-ohmic electric 53 is formed on the dielectric layer 52. An ohmic electrode 54, preferably comprising aluminum in the majority, is formed on the opposite ridged face of semiconductor ceramic 51.

The condenser of this embodiment is also capable of exhibiting a large capacitance as is the case of the foregoing embodiments.

It should be noted that, in the preceding embodiments, a silver electrode can be formed on the ohmic electrode for the purpose of attaching a lead were thereto by means of soldering or the like.

As will be apparent from the foregoing description, this invention is characterized in that the non-ohmic electrode is formed on one face of the reduction reoxidation type semiconductor ceramic and on the other face the ohmic electrode, preferably comprised of aluminum is formed. The condenser according to this invention can provide a large capacitance in comparison to the conventional condenser of similar type and can be miniaturized if a similar capacitance is desired.

The present invention has been disclosed in terms of preferred embodiments. The invention however, should not be limited thereto and instead should be measured by the appended claims and their equivalents.

What is claimed is:

1. A reduction reoxidation type ceramic semiconductor condenser comprising:
 a semiconductor ceramic portion, a layer of a first material on a surface of said ceramic portion forming an ohmic electrode thereon, a dielectric layer on another surface of said ceramic portion, said dielectric layer being formed by reoxidation of said ceramic, a layer of a second material on a surface of said dielectric layer, said second material forming a non-ohmic electrode thereon, said ohmic layer being comprised of electrode forming material capable of forming said ohmic electrode during reoxidation of said ceramic portion while preventing significant oxidation of said ceramic portion in contact with said electrode forming material.

2. The reduction reoxidation type ceramic semiconductor condenser of claim 1 wherein said electrode forming material is a glass frit containing aluminum metal.

3. The reduction reoxidation type ceramic semiconductor condenser of claim 2 wherein said ohmic electrode consists essentially of aluminum and glass.

4. The reduction reoxidation type ceramic semiconductor condenser of claim 1 wherein said condenser is relatively thin and substantially planar, said condenser having relatively small edges and relatively large opposite planar surfaces, said electrode being located on the opposite planar surfaces of said condenser.

5. The reduction reoxidation type ceramic semiconductor condenser of claim 4 wherein said condenser includes non-ohmic electrode in the form of layers on opposite planar surfaces of said condenser, said non-ohmic electrode layers being electrically connected by connector means passing through said ceramic portion.

6. A method of forming a reduction reoxidation type ceramic semiconductor condenser from a ceramic semiconductor, said method comprising: applying a layer of non-ohmic electrode forming material to one portion of said ceramic semiconductor and applying a layer of ohmic electrode forming material to another portion of said ceramic semiconductor, said ohmic electrode forming material being disposed to form said ohmic electrode on said ceramic material during reoxidation while preventing reoxidation of the portions of said ceramic semiconductor in contact with said ohmic electrode forming material; and exposing the ceramic semiconductor having the electrode forming layers thereon to an oxidizing atmosphere and elevated temperatures sufficient to form a dielectric layer on said ceramic semiconductor by reoxidation of the surface of said ceramic semiconductor not in contact with said ohmic electrode forming material.

7. The method of claim 6 wherein said ohmic electrode forming material is a glass frit containing aluminum metal.

8. The method of claim 7 wherein said glass frit comprises more than 50% aluminum.

9. The method of claim 8 wherein said ohmic electrode forming material comprises glass, aluminum metal and an organic binder.

10. The method of claim 7 wherein said glass frit consists essentially of borosilica lead glass and aluminum metal, said aluminum metal comprising more than 50% by weight of said frit.

* * * * *